US012789577B2

(12) United States Patent
Jensen et al.

(10) Patent No.: US 12,789,577 B2
(45) Date of Patent: Nov. 10, 2026

(54) SHUTTLE VALVE SHOCK ASSEMBLY

(71) Applicant: Fox Factory, Inc., Duluth, GA (US)

(72) Inventors: Karl Jensen, Jefferson, GA (US); Ola Christopher Nilsson, Flowery Branch, GA (US)

(73) Assignee: Fox Factory, Inc., Duluth, GA (US)

( * ) Notice: Subject to any disclaimer, the term of this patent is extended or adjusted under 35 U.S.C. 154(b) by 62 days.

(21) Appl. No.: 18/585,878

(22) Filed: Feb. 23, 2024

(65) Prior Publication Data

US 2024/0286452 A1 Aug. 29, 2024

Related U.S. Application Data

(60) Provisional application No. 63/447,735, filed on Feb. 23, 2023.

(51) Int. Cl.
*B60G 17/08* (2006.01)

(52) U.S. Cl.
CPC .......... *B60G 17/08* (2013.01); *B60G 2202/24* (2013.01)

(58) Field of Classification Search
CPC ..... B60G 17/08; B60G 2202/24; B60G 13/08
See application file for complete search history.

(56) References Cited

U.S. PATENT DOCUMENTS 4,460,073 A * 7/1984 Smeltzer .................. F16F 9/50 188/322.13
4,813,519 A * 3/1989 Matsubara ............. F16F 9/096 267/64.15
6,296,092 B1 10/2001 Marking et al.
7,374,028 B2 5/2008 Fox
8,838,335 B2 9/2014 Bass et al.
9,353,818 B2 5/2016 Marking
9,623,716 B2 4/2017 Cox
9,682,604 B2 6/2017 Cox et al.
9,797,467 B2 10/2017 Wootten et al.
10,036,443 B2 7/2018 Galasso et al.
10,072,722 B2 * 9/2018 Bandy ..................... F16F 9/067
10,415,662 B2 9/2019 Marking
10,576,803 B2 3/2020 Marking et al.
10,598,247 B2 * 3/2020 Schmidt .................. F16F 9/064
2006/0266602 A1 * 11/2006 Robertson ............... F16F 9/063 188/322.15
2010/0072760 A1 * 3/2010 Anderson .............. B60G 13/14 290/1 R
2010/0244340 A1 * 9/2010 Wootten ................. B60G 15/12 188/313
2013/0147205 A1 * 6/2013 Tucker ...................... F16F 9/19 290/1 A (Continued)

FOREIGN PATENT DOCUMENTS

JP 2005180689 A * 7/2005

*Primary Examiner* — Kurt Philip Liethen

(57) ABSTRACT

A shuttle valve shock assembly is disclosed. The shuttle valve shock assembly includes a main chamber, a reservoir fluidically coupled with the main chamber, and a valve configured to control flow of fluid between the main chamber and the reservoir along a flow path. The valve configured to restrict the flow of the fluid between the main chamber and the reservoir, along the flow path, during a rebound stroke of the shock assembly; and allow flow of the fluid between the main chamber and the reservoir, along the flow path, during a compression stroke of the shock assembly.

16 Claims, 12 Drawing Sheets

(56) References Cited

U.S. PATENT DOCUMENTS

| | | | | |
|---|---|---|---|---|
| 2016/0059664 | A1* | 3/2016 | Tucker | B60G 17/08 280/124.159 |
| 2017/0129566 | A1* | 5/2017 | Barefoot | B60G 15/12 |
| 2022/0176769 | A1 | 6/2022 | Tong | |
| 2023/0092250 | A1* | 3/2023 | Tomlin | F16F 9/5126 188/322.15 |

* cited by examiner

720

SHUTTLE VALVE SHOCK ASSEMBLY

CROSS-REFERENCE TO RELATED APPLICATIONS (PROVISIONAL)

This application claims priority to and benefit of U.S. Provisional Patent Application No. 63/447,735 filed on Feb. 23, 2023, entitled "SHUTTLE VALVE SHOCK" and assigned to the assignee of the present application, the disclosure of which is hereby incorporated by reference in its entirety.

FIELD OF THE INVENTION

Embodiments of the invention generally relate to methods and apparatus useful for a shock assembly.

BACKGROUND

Shock assemblies are used in numerous applications. They can be found in vehicles, houses, stores, furniture, prosthetics, and the like. Often, they are configured to absorb some or all of an input that is received at a first portion of a component before it is transmitted to a second portion of the component. For example, when a front wheel of a vehicle hits a rough spot, the encounter will cause an impact force. By utilizing suspension components including one or more shock assemblies, the impact force can be significantly reduced or even absorbed completely before it is transmitted to a suspended portion of the vehicle.

In a shock assembly, cavitation happens when there's a pressure differential across the main piston when the piston is moving in either a compression stroke or a rebound stroke. Cavitation causes performance degradation as the fluid becomes aerated. E.g., inconsistencies are introduced in the fluid which can result in inconsistencies in damping characteristics and/or performance. These performance differences are simply illustrated as a comparison between moving an object (e.g., the damping piston) through a fluid versus moving it through a foam. In a liquid, there is basically no compression of the fluid as pressure is added and as such, the liquid will act uniformly and consistently across different pressure ranges. In contrast, as pressure is added to a foam, the gasses within the foam can be compressed while the fluid will remain incompressible. As such, the foam will act non-uniformly and inconsistently across different pressure ranges.

In addition, cavitation will cause the fluid to start breaking down quicker causing the fluid life to be reduced. As such, it is an ongoing goal to reduce or remove cavitation from occurring during the operation of a shock assembly.

BRIEF DESCRIPTION OF THE DRAWINGS

Aspects of the present invention are illustrated by way of example, and not by way of limitation, in the accompanying drawings, wherein.

Figure 1:
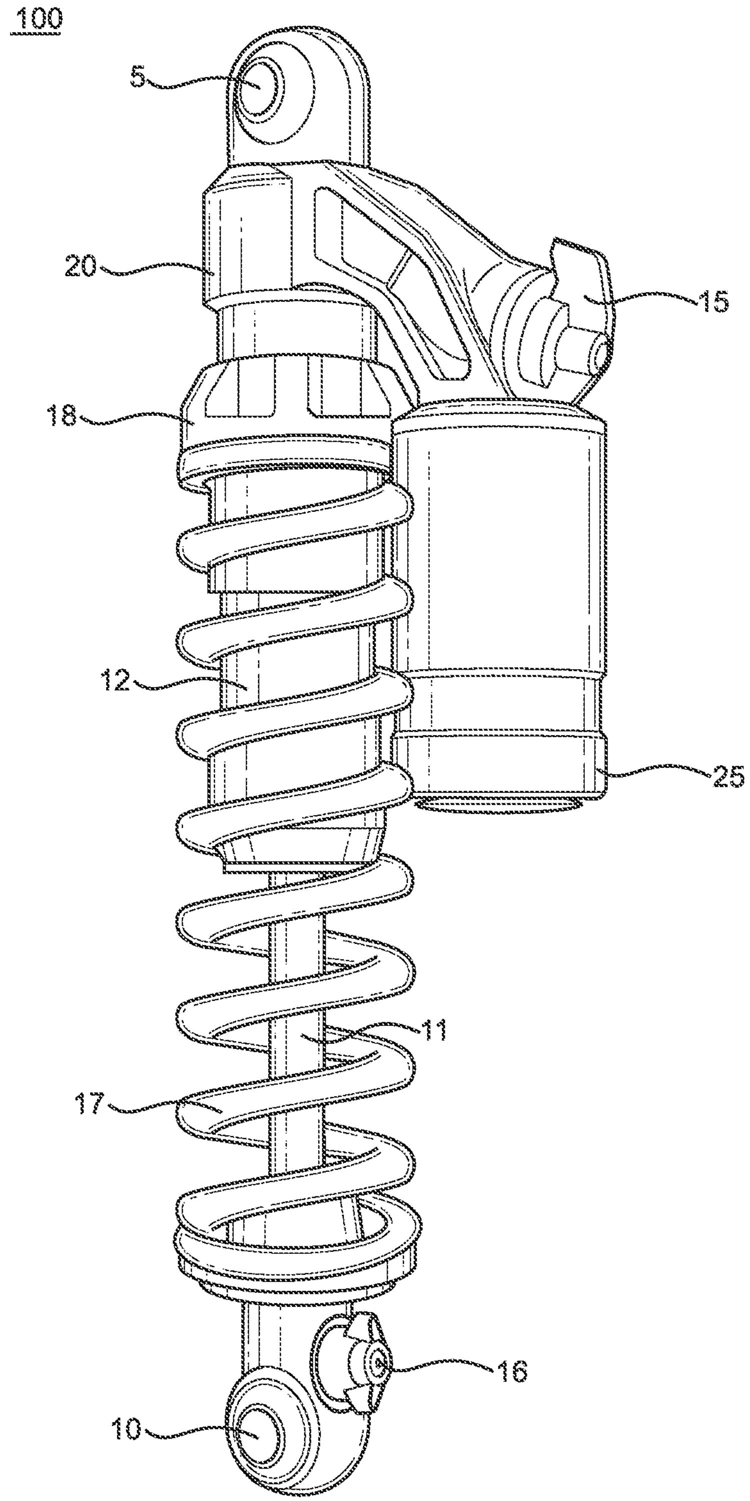
FIG. 1 is a perspective view of a shuttle valve shock assembly, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

TERMINOLOGY

In the following discussion, a number of terms and directional language is utilized. It should be appreciated that the shuttle valve shock assembly described herein can be used in a plurality of applications. Examples of applications include one or more shock assemblies on a vehicles such as, but not limited to a bicycle, an electric bike (e-bike), a hybrid bike, a scooter, a motorcycle, an ATV, a personal water craft (PWC), a vehicle with three or more wheels (e.g., a UTV such as a side-by-side, a car, truck, etc.), a snow machine, an aircraft, and the like. Additional applications also include device such as, but not limited to, an exoskeleton, a seat frame, a prosthetic, a suspended floor, a doorway, trunk, hood, tailgate, and the like.

In general, a suspension system provides a motion modifiable connection between a component that is in contact with a surface (e.g., an unsprung portion) and some or all of the rest of the device that is not in contact with the surface (e.g., a suspended portion).

For example, in a suspension system for a vehicle, the unsprung portion of the vehicle that is in contact with the surface can include one or more wheel(s), skis, tracks, hulls, etc., while some or all of the rest of the vehicle that is not in contact with the surface include suspended portions such as a frame, a seat, handlebars, engines, cranks, etc.

The suspension system will include one or numerous components which are used to couple the unsprung portion of the vehicle (e.g., wheels, skids, wings, belt, etc.) with the suspended portion of the vehicle (e.g., seat, cockpit, passenger area, cargo area, etc.). Often, the suspension system will include one or more shock assemblies which are used to reduce feedback from the unsprung portion of the vehicle before that feedback is transferred to the suspended portion of the vehicle, as the vehicle traverses an environment. However, the language used by those of ordinary skill in the art to identify a shock assembly used by the suspension system can differ while referring to the same (or similar) types of components. For example, some of those of ordinary skill in the art will refer to the shock assembly as a shock absorber, while others of ordinary skill in the art will refer to the shock assembly as a damper (or damper assembly).

The shock assembly often consists of a (damping) piston and piston rod telescopically mounted in a fluid filled cylinder (e.g., a housing). The fluid (e.g., damping fluid, working fluid, etc.) may be, for example, a hydraulic oil, a gas such as nitrogen, air, or the like. In one embodiment, the shock assembly will include a mechanical spring (e.g., a helically wound spring that surrounds or is mounted in parallel with the body of the shock assembly). In one embodiment, the shock assembly will include an air spring. In one embodiment, the shock assembly will include both a mechanical spring and an air spring.

In its basic form, the suspension is used to increase ride comfort, performance, endurance, component longevity, and the like. In general, the force of jarring events, rattles, vibrations, jostles, and the like which are encountered by the portion of the vehicle, device, or component that is in contact with the surface is reduced or even removed as it transitions through the shock assembly.

The term "active", as used when referring to a valve or shock assembly component, means adjustable, manipulatable, etc., during typical operation of the valve. For example, an active valve can have its operation changed to thereby alter a corresponding shock assembly characteristic damping from a "soft" setting to a "firm" setting (or a stiffness setting somewhere therebetween) by, for example, adjusting a switch in a passenger compartment of a vehicle, device, or the like. Additionally, it will be understood that in some embodiments, an active valve may also be configured to automatically adjust its operation, and corresponding shock assembly damping characteristics, based upon, for example, operational information pertaining to the vehicle, device, or the like and/or the suspension with which the valve is used.

Similarly, it will be understood that in some embodiments, an active valve may be configured to automatically adjust its operation, and corresponding shock assembly damping characteristics, based upon received user input settings (e.g., a user-selected "comfort" setting, a user-selected "sport" setting, and the like). In many instances, an "active" valve is adjusted or manipulated electronically (e.g., using a powered solenoid, electric motor, poppet, or the like) to alter the operation or characteristics of a valve and/or other component. As a result, in the field of suspension components and valves, the terms "active", "electronic", "electronically controlled", and the like, are often used interchangeably.

The term "manual" as used when referring to a valve or shock assembly component means manually adjustable, physically manipulatable, etc., without requiring disassembly of the valve, damping component, or shock assembly which includes the valve or damping component. In some instances, the manual adjustment or physical manipulation of the valve, damping component, or shock assembly which includes the valve or damping component, occurs when the valve is in use. For example, a manual valve may be adjusted to change its operation to alter a corresponding shock assembly damping characteristic from a "soft" setting to a "firm" setting (or a stiffness setting somewhere therebetween) by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the device".

It should further be understood that a suspension system may also be referred to using one or more of the terms "passive", "active", "semi-active" or "adaptive". As is typically used in the suspension art, the term "active suspension" refers to a suspension which controls the vertical movement. Moreover, "active suspensions" are conventionally defined as either a "pure active suspension" or a "semi-active suspension" (a "semi-active suspension" is also sometimes referred to as an "adaptive suspension"). In a conventional "pure active suspension", a motive source such as, for example, an actuator, is used to move (e.g. raise or lower) a wheel with respect to the vehicle. In a "semi-active suspension", no motive force/actuator is employed to adjust move (e.g. raise or lower) a wheel with respect to the vehicle.

Rather, in a "semi-active suspension", the characteristics of the suspension (e.g. the firmness of the suspension) are altered during typical use to accommodate conditions of the terrain and/or the vehicle. Additionally, the term "passive suspension", refers to a suspension in which the characteristics of the suspension are not changeable during typical use. For example, no motive force/actuator is employed to adjust (e.g. raise or lower) the height of a wheel with respect to the vehicle. As such, it will be understood that an "active valve", as defined above, is well suited for use in a "pure active suspension" or a "semi-active suspension".

In the following discussion, one or more of the component of the shuttle valve shock assembly may be active and/or semi-active. In general, an active and/or semi-active component will have one or more electronically adjustable features controlled by a motive component such as a solenoid, stepper motor, electric motor, or the like. In operation, the active and/or semi-active component will receive an input command which will cause the motive component to move, modify, or otherwise change one or more aspects of one or more electronically adjustable features.

In one embodiment, the shuttle valve shock assembly may be used in active valve suspensions and components, and may include base valves, compression valves, rebound valves, and the like. Embodiments of different active valve suspension and components where the shuttle valve shock assembly may be utilized are disclosed in U.S. Pat. Nos. 8,838,335; 9,353,818; 9,682,604; 9,797,467; 10,036,443; 10,415,662; the content of which are incorporated by reference herein, in their entirety.

Conventionally, solving high shaft speed cavitation (e.g., the pressure differential) in a shock assembly included a number of different approaches such as, but not limited to, introducing cavitation barrier type devices, increasing the pressure on the nitrogen gas side of an internal floating piston (IFP) (up to values such as, but not limited to 200 psi, etc.), increasing the pressure by some other means such as, but not limited to, stiffening a shim stack of the piston (e.g., increasing the shim cracking (or opening) pressures, etc.), reducing potential piston speeds within the main damper, and the like.

However, these solutions only move the pressure differential problem into a different performance range of the shock assembly, e.g., low shaft speed performance. That is, ramping up the pressures to address high shaft speed pressure differential issues will cause an imbalance of pressures at lower shaft speeds. Thus, compensating for the higher shaft speeds by increasing pressure within the system will typically translate to an increase in harshness in the shock assembly during normal operation. In other words, the increased pressure will cause additional stiffness in the shock assembly, and as such, the softest damping characteristics and shock assembly performance will be lost.

Referring now to FIG. 1, a perspective view of a shuttle valve shock assembly 100 is shown in accordance with an embodiment. In one embodiment, shuttle valve shock assembly 100 is a coil-over shock assembly, such as, for example, a FOX 2.0 zero QS3-R shock assembly with a velocity-sensitive shimmed damping system, one or more coil-over springs 17, a spring preload adjuster 18, and a fluid reservoir 25. Although in one embodiment the shuttle valve shock assembly 100 is a coil-over style shock assembly. In another embodiment, the shuttle valve shock assembly 100 is a FOX load optimizing air technology (FLOAT) air shock assembly with a reservoir. In general, an air shock assembly is a high-performance shock assembly that use air as springs, instead of heavy steel coil springs or expensive titanium coil springs. In another embodiment, the shuttle valve shock assembly 100 may be another type of shock assembly such as, but not limited to, a stand-alone fluid damper assembly, a coil sprung adjustable shock assembly, an air sprung fluid damper assembly, a twin-tube shock assembly, or the like. In one embodiment, fluid reservoir 25 is a remote fluid reservoir.

In general, shuttle valve shock assembly 100 includes attachment features such as, in one embodiment, a chassis mount (e.g., upper eyelet 5) and a frame mount (e.g., lower eyelet 10) which allow shuttle valve shock assembly 100 to be coupled between the unsprung portion of the suspension (e.g., the components of the suspension affected by, or in contact with, the terrain) and the sprung portion. In one embodiment, if the shuttle valve shock assembly 100 is installed in an inverted configuration, upper eyelet 5 would be a frame mount and lower eyelet 10 would be the chassis mount.

In one embodiment, shuttle valve shock assembly 100 includes body 12, a body cap 20, and a fluid reservoir 25 fluidly coupled with the body 12.

A configuration of an external and/or side fluid reservoir 25, including a floating piston, is described in U.S. Pat. No. 7,374,028 the content of which is incorporated by reference herein, in its entirety.

In one embodiment, shuttle valve shock assembly 100 optionally includes a compression adjuster 15 and/or a rebound adjuster 16. In one embodiment, the components shown as being associated with shuttle valve shock assembly 100 may also be included in one or more other active and/or semi-active shock assemblies of a vehicle, device, or the like, upon which shuttle valve shock assembly 100 is coupled.

In one embodiment, compression adjuster 15 is coupled with the shuttle valve shock assembly 100 and is used to provide an adjustment capability to the compression damping characteristics of the shuttle valve shock assembly 100. In one embodiment, there is no compression adjuster 15 coupled with the shuttle valve shock assembly 100. In one embodiment, compression adjuster 15 will modify the size of the flow path into the fluid reservoir 25 thereby adjusting the compression characteristics (e.g., firm, soften, lock out, etc.) of the shuttle valve shock assembly 100.

In one embodiment, a rebound adjuster 16 is coupled with the shuttle valve shock assembly 100 and is used to provide an adjustment capability to the rebound damping characteristics of the shuttle valve shock assembly 100. In one embodiment, there is no rebound adjuster 16 coupled with the shuttle valve shock assembly 100. In one embodiment, rebound adjuster 16 will modify the cracking pressure of the rebound piston valve stack thereby adjusting the rebound characteristics (e.g., firm, soften, etc.) of the shuttle valve shock assembly 100.

In one embodiment, there is both a compression adjuster 15 and a rebound adjuster 16 coupled with the shuttle valve shock assembly 100. In one embodiment, compression adjuster 15 and/or rebound adjuster 16 are manual adjusters that receive manual inputs. E.g., a user turns a knob that mechanically modifies a damping characteristic. In one embodiment, compression adjuster 15 and/or rebound adjuster 16 are electronically actuated. E.g., a signal is received by an actuator which modifies a damping characteristic.

For additional detail and description of a shock assembly, see, as an example, U.S. Pat. No. 10,576,803 the content of which is incorporated by reference herein, in its entirety. For additional detail and description of position-sensitive shock absorber/damper, see, as an example, U.S. Pat. No. 6,296,092 the content of which is incorporated by reference herein, in its entirety.

For additional detail and description of adjustable compression and/or rebound damping, preload, crossover, bottom-out, and the like for a shock absorber/damper, see, as an example, U.S. Pat. No. 10,036,443 the content of which is incorporated by reference herein, in its entirety.

Although components of FIG. 1, are shown in given locations in accordance with one embodiment, in other embodiments, one, some, or all of the components shown in FIG. 1 could be inverted, located in other locations, one or more components could be separated into two or more pieces and dispersed, two or more components could be integrated into a single piece, etc. The use of the locations of the components as shown in FIG. 1 is indicative of one embodiment, which is provided for purposes of clarity.

Figure 2A:
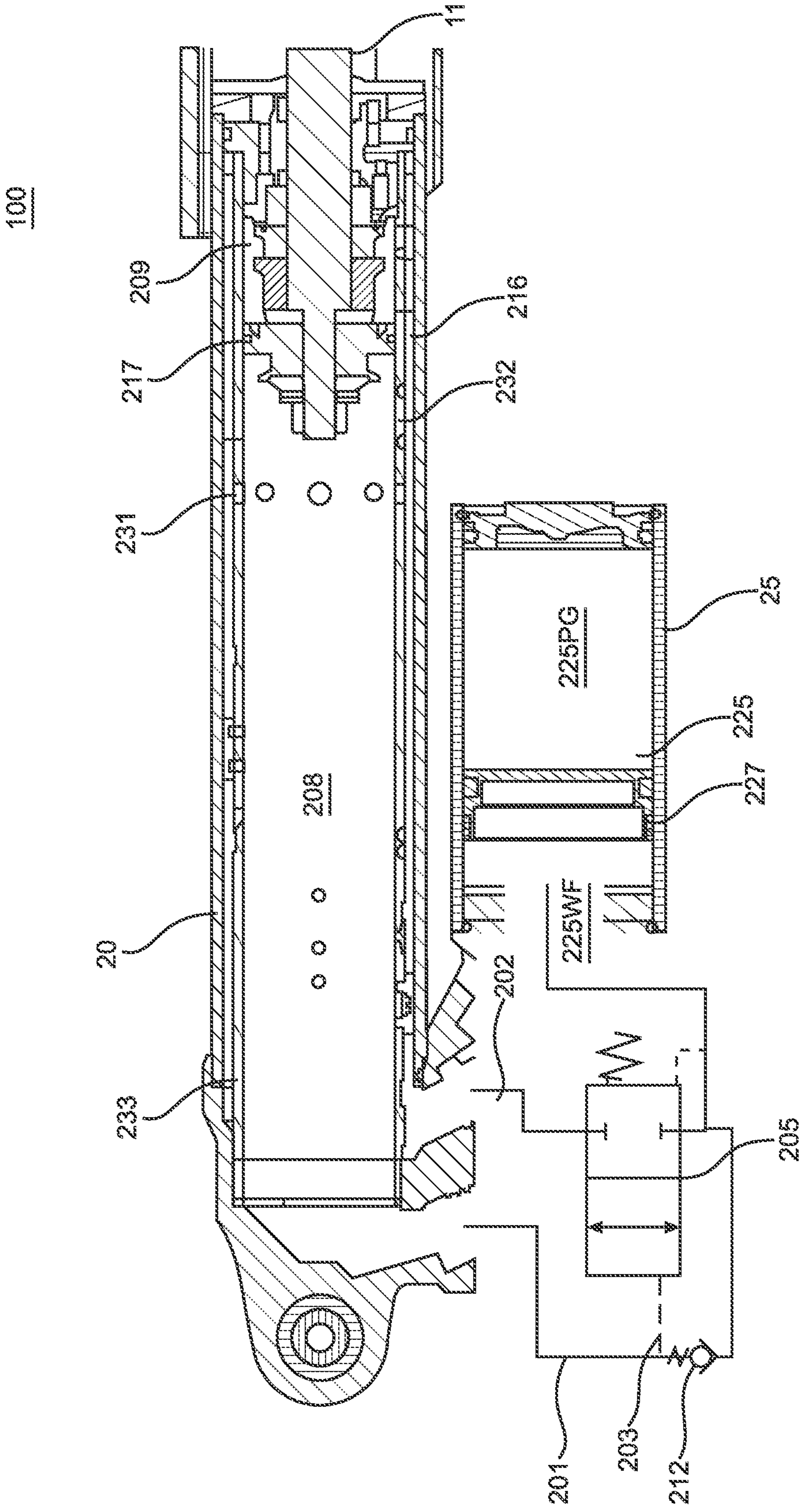
FIG. 2A is a cross-section and schematic view of a portion of the shuttle valve shock assembly of FIG. 1 showing a bypass assembly configuration, in accordance with an embodiment.

With reference now to FIG. 2A, a cross-section view of shuttle valve shock assembly 100 of FIG. 1 is shown in accordance with an embodiment. For purpose of clarity, in the discussion of FIG. 2A, all of the components described in FIG. 1 are incorporated by reference in their entirety.

In one embodiment, the shock assembly 100 has a body 12 having a chamber 233, in one embodiment, body 12 includes a tubular body 232 (e.g., a secondary chamber, or the like), and an annular volume 216, formed between the outer diameter (OD) of tubular body 232 and the inner diameter (ID) of body 12. In one embodiment, tubular body 232 may be of a different geometric shape other than a tube, the use of tubular herein is provided in accordance with one embodiment and used for purposes of clarity.

In one embodiment, the fluid volume within the tubular body 232 is bifurcated by the piston 217 into two variable volumes: a compression volume 208 and a rebound volume 209.

In one embodiment, to provide one of the fluid pathways for fluid communication between the compression volume 208 and the rebound volume 209, a plurality of bypass openings 231 are provided through the wall of the tubular body 232 between the inner volume of the tubular body 232 and the annular volume 216, and a plurality of passages are provided within the annular volume 216. Thus, during movement of the piston 217 within the tubular body 232, fluid may flow between the compression volume 208 and the rebound volume 209 portions of the tubular body 232 as the actual volume (size) of those volumes change as the piston 217 moves within the tubular body 232, from bypass openings 231 through the annular volume 216 and into the rebound volume 209, and, if the piston 217 is disposed intermediate of the openings 231, for example, wherein an opening is on one side of the piston 217 and another opening is on another side of the piston 217, flow may occur therethrough between the rebound volume 209 and compression volume 208, respectively. These un-valved openings, and passages thus provide a direct, through restricted by the cross section and of the openings, flow pathway for fluid between the compression volume 208 and the rebound volume 209 during piston 217 movement within the tubular body 232.

In one embodiment, the piston 217 is received over a reduced diameter, at least partially threaded, end portion of the shaft 11, and fixedly connected thereto by virtue of a nut or other fastener threadingly secured on the reduced diameter end portion to secure the piston 217 with the shaft 11.

In one embodiment, the piston 217 includes about the outer circumference thereof a plurality of ring shaped lip or other types of seals, to enable sealing of the piston 217 against the inner surface of the tubular body 232 and thus across the piston 217 between the compression volume 208 and the rebound volume 209. Additionally, the piston 217 is configured to enable flow therethrough based upon the pressure difference between the compression volume 208 and rebound volume 209. This is enabled, in one embodiment, by the use of "shims" on either side of the piston 217, which are configured to selectively overlay one or more piston 217 openings extending through the piston 217 to selectively open fluid communication between the rebound volume 209 and compression volume 208, respectively. The stiffness of the shims, and the number and configurations of the shims, determines the differential pressure at which the shim will bend away from the piston 217 openings and thus allow fluid flow from a higher pressure volume to a lower pressure volume directly there through.

Further discussion of the components, assembly, and operation of a bearing housing bypass assembly that includes the features discussed above can be found in published U.S. Patent application 2022/0176769, the content of which are incorporated by reference herein, in its entirety.

In one embodiment, the fluid reservoir 25 has a reservoir chamber 225 that is divided by an IFP 227. In one embodiment, one side (225PG) of the IFP 227 divided reservoir chamber 225 is filled with a pressurized gas (e.g., nitrogen, or the like) and the other side (225WF) of reservoir chamber 225 is fluidly coupled with chamber 233 of body 12 via flow paths 201 and 202 and contains working fluid. In general, the IFP 227 keeps the pressurized gas from mixing with the working fluid.

In one embodiment, a plurality of flow paths (e.g., main flow path 201 and bypass flow path 202) fluidly couple the chamber 233 of body 12 with the reservoir chamber 225. Main flow path 201 provides a fluid pathway between the compression volume 208 of main chamber 233 and the reservoir 25. Bypass flow path 202 provides a flow path between the bypass openings 231 through the annular volume 216 and into the reservoir 25. In one embodiment, the shuttle valve 205 is fluidly coupled with the two flow paths.

In one embodiment, the piston 217 disposed on the shaft 11 moves within the damper housing in response to forces imposed on the housing and the rod. In general, the piston 217 divides the damping chamber into a bifurcated chamber having a compression side and a rebound side. However, the movement of the piston 217 is dampened by the presence of the fluid in the damper housing. In order for the piston 217 to move within the damper housing, fluid on one side of the piston 217 (e.g., on the compression side) must be able to move to another location (such as the rebound side) and vice-versa. In one embodiment, the fluid can move to the different side by passing through one or more openings such as, but not limited to, one or more valved openings in the piston 217, one or more valved openings in a bypass assembly, valved openings to an optional secondary reservoir fluidly connected to the damper housing, and the like.

In one embodiment, during at least a portion of a piston stroke, fluid on one side of the piston 217 is able to move through the piston 217, to the fluid volume on the opposite side of the piston 217, through one or more valves within the body of the piston 217.

In one embodiment, during at least a portion of the piston stroke, fluid on one side of the piston 217 is able to move to the fluid volume on the opposite side of the piston 217, through a bypass assembly (e.g., circumventing the piston 217). In one embodiment, the amount of fluid and the flow rate of the bypass is piston 217 location dependent. In other words, it will depend upon the location of the piston 217 within the damper housing.

In one embodiment, when a secondary reservoir is present, during at least a portion of a piston stroke fluid in the damper housing is able to move to the secondary reservoir through valved openings in the secondary reservoir fluidly connected to the damper housing.

Thus, in one embodiment, the rate of fluid flow between the fluid volumes on either side of the piston 217, and between the fluid volumes in the damper housing and the secondary reservoir, can be used to modify, adjust, or otherwise tune the dampening effect of the shock assembly upon the vehicle in which it is used.

Figure 2B:
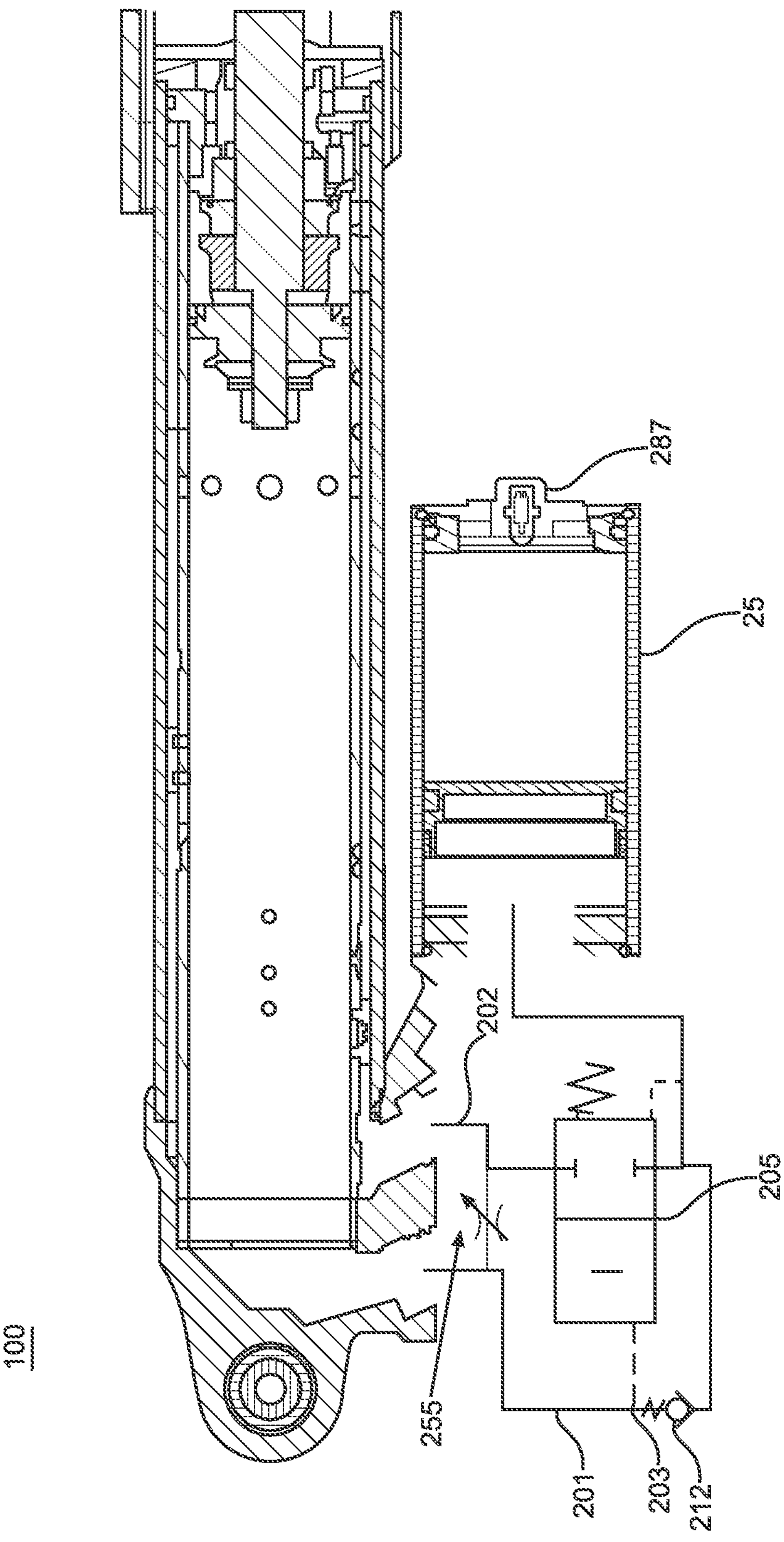
FIG. 2B is a cross-section and schematic view of a portion of the shuttle valve shock assembly of FIG. 1 showing a bypass assembly configuration and an adjustable flow control, in accordance with an embodiment.

With reference now to FIG. 2B, a cross-section and schematic view of a portion of the shuttle valve shock assembly 100 of FIG. 1 with a bypass assembly configuration and an adjustable flow control 255 is shown in accordance with an embodiment. In one embodiment, the adjustable flow control 255 is used between main flow path 201 and bypass flow path (e.g., between the rebound and compression pathways). In one embodiment, adjustable flow control 255 is a manual valve. In one embodiment, adjustable flow control 255 is an active valve. In general, the adjustable flow control 255 is able to provide an adjustable flow rate between the main chamber and the reservoir 25. By using the adjustable flow control 255, the firmness of the shock assembly during compression and/or rebound can be adjusted without requiring any modification to the main piston valving.

In one embodiment, instead of an adjustable flow control 255 located between main flow path 201 and bypass flow path, one or both of the main flow path 201 and bypass flow path will include an adjustable flow control 255.

Figure 3A:
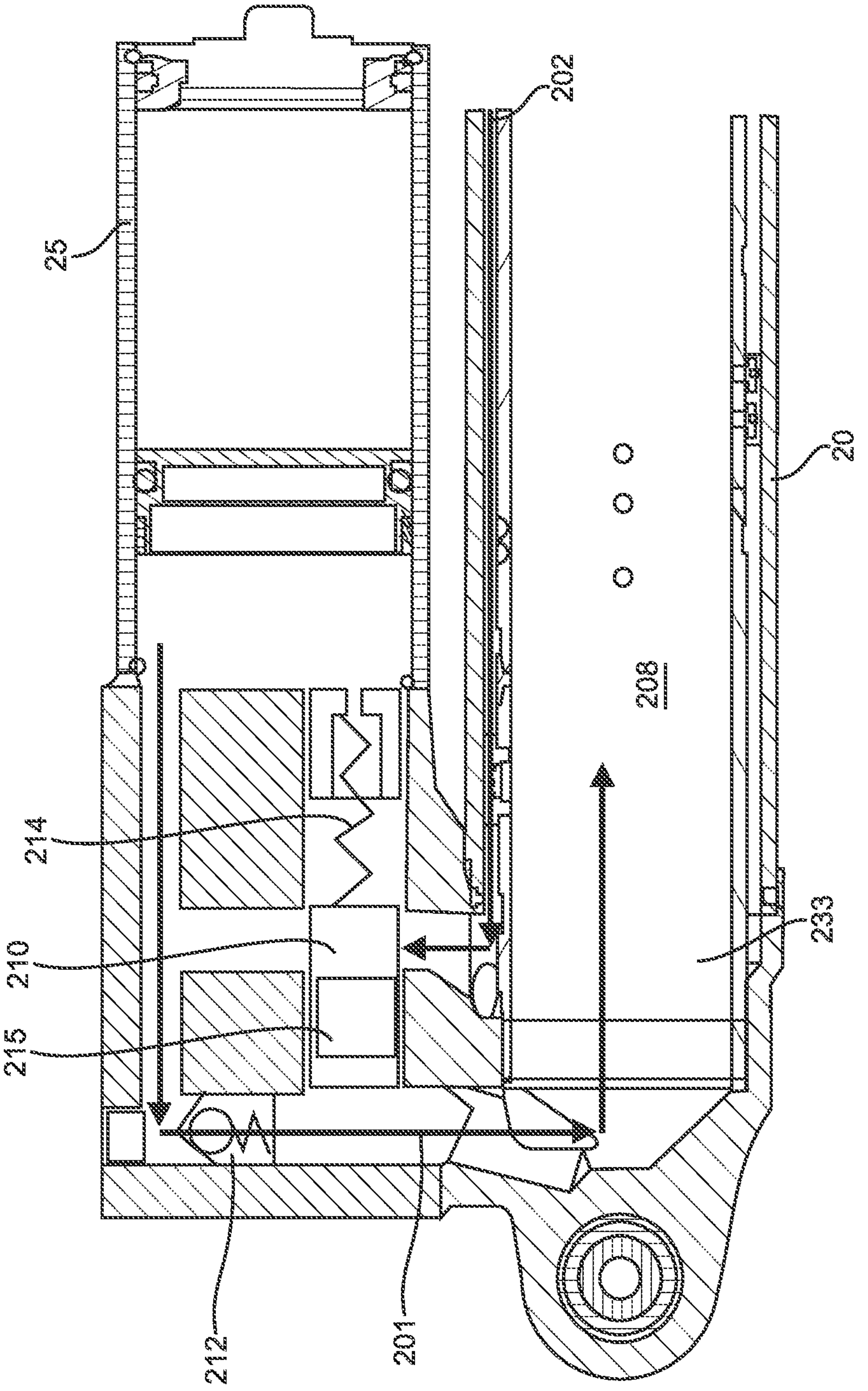
FIG. 3A is a cross-section view of a portion of the shuttle valve shock assembly with the shuttle valve in a closed position during a rebound stroke, in accordance with an embodiment.
Figure 3B:
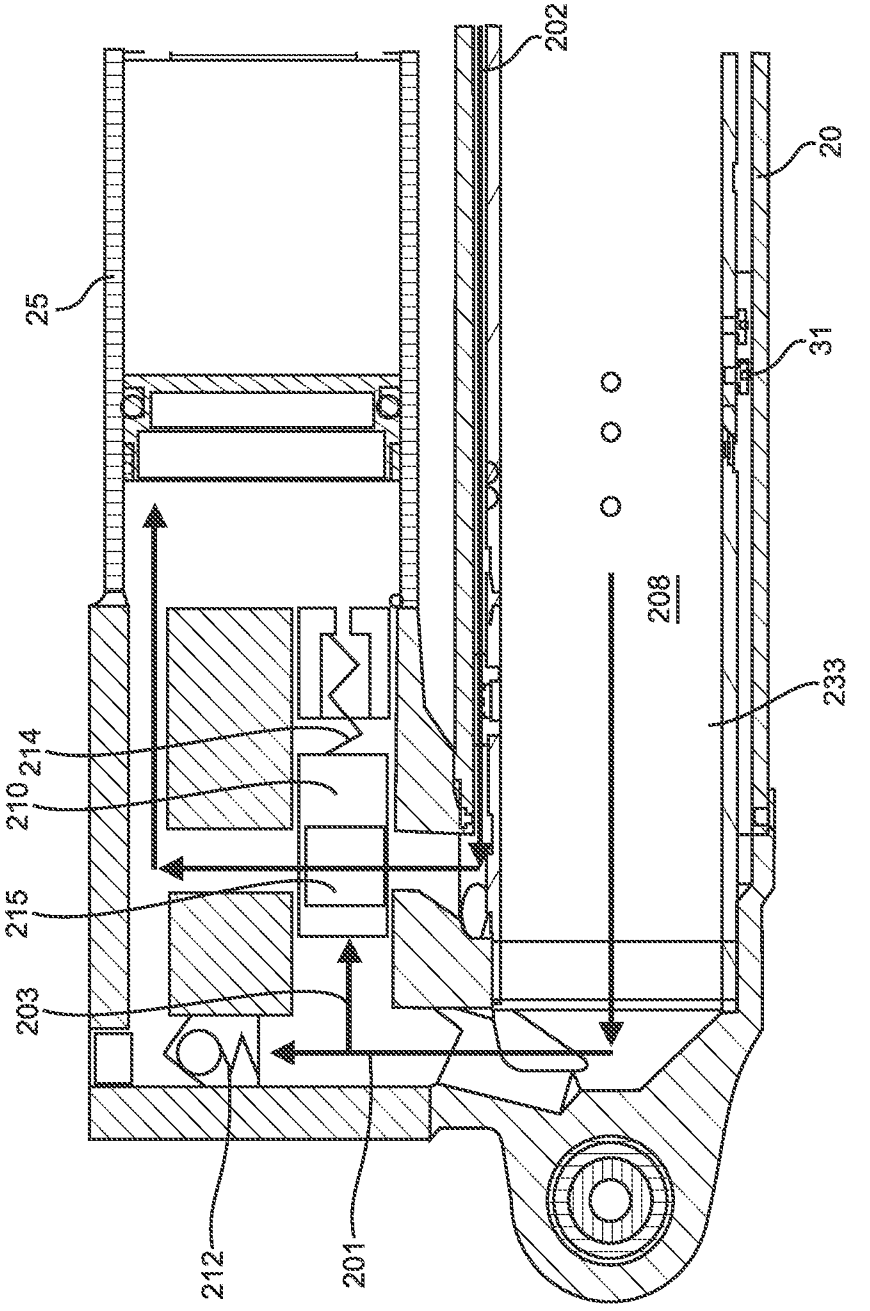
FIG. 3B is a cross-section view of a portion of the shuttle valve shock assembly with the shuttle valve in an open position during a compression stroke, in accordance with an embodiment.

With reference now to FIG. 3A, a cross-section view of a portion of the shuttle valve shock assembly 100 with the shuttle valve 205 in a closed position during a rebound stroke is shown in accordance with an embodiment.

In one embodiment, shuttle valve 205 includes a shuttle 210, a flow path 215, and a spring 214. In one embodiment, shuttle valve 205 rests in a closed position due to the spring pressure from spring 214 upon shuttle 210. In the closed position, the shuttle 210 blocks the flow path 202 from passing through the shuttle valve 205 as the fluid tries to flow into the reservoir 25.

However, the fluid from the reservoir 25 is able to pass through the check valve 212 in the open direction along flow path 201 to return from the reservoir 25 to the compression volume 208 of the main chamber 233.

In one embodiment, open flow path 201 will allow fluid to flow freely from the reservoir 25 along flow path 201 and into the main chamber 233. As such, the working fluid on the compression side of the piston 217 will have the same pressure as the reservoir 25. By having the pressures equalized between the compression volume 208 and the reservoir 25, the reservoir pressure can be set as low as desired without concern for deleterious cavitation. In so doing, the shock assembly 100 is able to have lower internal operating pressures.

Referring now to 3B, a cross-section view of a portion of the shuttle valve shock assembly 100 with the shuttle valve 205 in an open position during a compression stroke is shown in accordance with an embodiment.

During the compression stroke, the main flow path 201 from the main chamber 233 into the reservoir 25 will encounter check valve 212 and will also branch into compression pressure port 203 and encounter the shuttle valve 205. In one embodiment, the check valve 212 will stop flow into the reservoir 25 during the compression stroke.

In addition, the fluid pressure along the main flow path 201, caused by the incursion of the main piston 217 into the main chamber 233 and the closed check valve 212, will move along compression pressure port 203 to act against shuttle 210 of shuttle valve 205. This pressure increase will overcome the spring pressure of spring 214 and move shuttle 210 into an open position. When in the open position, the shuttle 210 will no longer be blocking flow path 215. As such, the bypass flow path 202 will be open from the bypass ports of the shock assembly 100 to the reservoir 25.

In one embodiment, the now open flow path 215 will allow fluid to flow freely through the bypass openings 231 along the bypass flow path 202 and into the reservoir 25 during the compression stroke. As such, the shaft displaced fluid on the rebound side of the piston 217 will have the same pressure as the reservoir 25. By having the pressures equalized between the rebound volume 209 and the reservoir 25, the reservoir pressure can be set as low as desired without concern for deleterious cavitation. In so doing, the shock assembly 100 is able to have lower internal operating pressures.

Moreover, the fluid on the compression side of the piston 217 will not be able to use the main flow path 201 due to the closed check valve 212. Instead, the fluid of the compression volume 208 will have to go through the piston 217 valving as the piston 217 moves into the main chamber 233. This will allow the valving of the piston 217 to provide the compression firmness for the shock assembly 100.

In one embodiment, check valve 212 is an active valve. In so doing, the active check valve 212 is able to provide an adjustable flow rate between the main chamber 233 and the reservoir 25 during a compression event. By using an active check valve 212, the firmness of the shock assembly 100 during compression can be adjusted in a softer direction. For example, based on the position of the piston 217 within the chamber 233, with respect to a ride zone, etc. This adjustability of active check valve 212 will allow adjustments to the compression firmness of the shock assembly 100 without requiring any modification to the main piston valving.

In one embodiment, an active valve is used in the valving of the main piston 217. The active valve is able to provide an adjustable flow rate through the main piston valving thereby allowing the firmness of the shock assembly 100 to be adjusted.

In one embodiment, an active valve is used in the valving of the main piston 217 and the check valve 212 is used to control the fluid flow between the main chamber 233 and the reservoir 25. In one embodiment, the active valve is used in the valving of the main piston 217 and an active check valve 212 is also used to control the fluid flow between the main chamber 233 and the reservoir 25.

In one embodiment, one, some, or all of the valving of the main piston 217, the main flow path 201, and the bypass flow path 202 utilize active valve(s). Additional information regarding active and semi-active valves, including those used for compression and/or rebound stiffness adjustments, preload adjustments, bottom-out control, preload adjustment, ride height adjustment, can be found in U.S. Pat. Nos. 9,353,818 and 9,623,716 the content of which are incorporated by reference herein, in their entirety.

Figure 4A:
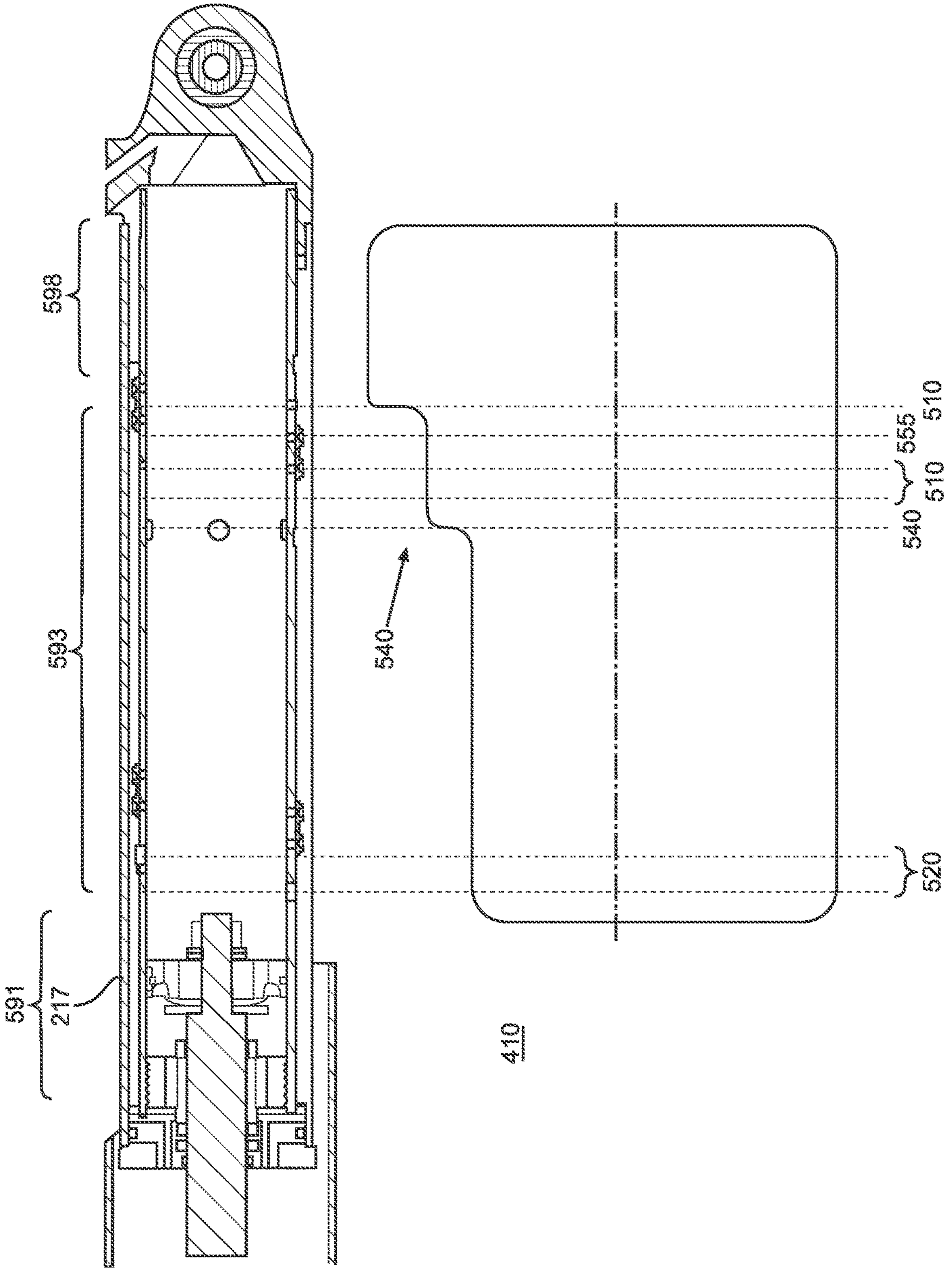
FIG. 4A is a side section view of the portion of the shuttle valve shock assembly with a graph thereunder illustrating a force-displacement curve in compression and rebound for the shuttle valve shock assembly, in accordance with an embodiment.

With reference now to FIG. 4A, a side section view of the portion of the shuttle valve shock assembly 100 with a graph 410 thereunder illustrating a force-displacement curve in compression and rebound for the shuttle valve shock assembly 100 is shown in accordance with an embodiment.

In shuttle valve shock assembly 100, the refill hole(s) 540 are located at the top of the ride zone 593 (e.g., at the most compressed side of ride zone 593) above the refill holes is the bottom out zone 598 and on the other side of the ride zone 593 is the top out zone 591.

In one embodiment, shuttle valve shock assembly 100 includes a number of rebound-side bypass orifices 520 as part of the bypass assembly 500. In one embodiment, shuttle valve shock assembly 100 also includes a number of compression-side bypass orifices 510 as part of the bypass assembly 500. In one embodiment, shuttle valve shock assembly 100 includes one or more position sensitive bleed holes 555. In FIG. 4A, the different bypasses, orifices, and bleeds are shown axially along the shuttle valve shock assembly 100 in a same plane as piston 217. In one embodiment, there are a plurality of different bypasses, orifices, and bleeds located around the circumference of the housing of shuttle valve shock assembly 100 in approximately the same plane. In one embodiment, there may be one or a plurality of the different bypasses, orifices, and bleeds located around the housing of shuttle valve shock assembly 100 that are not in the same plane.

Graph 410 is a force (lbs.) v. position (inches) graph that illustrates a force-displacement curve in compression and rebound for the shuttle valve shock assembly and is shown in accordance with one embodiment. In graph 410, the main piston 217 does not pass the refill hole(s) 540.

Figure 4B:
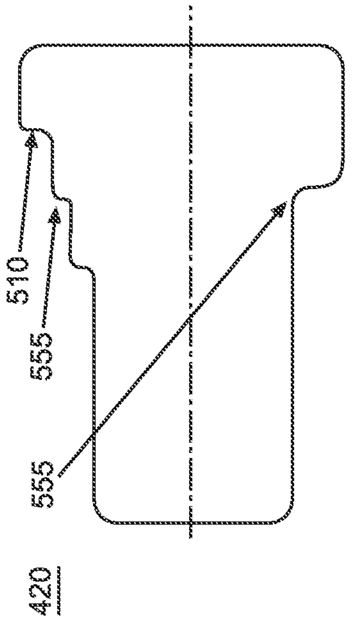
FIG. 4B is a graph illustrating a force-displacement curve in both rebound and compression for the shuttle valve shock assembly with the inclusion of an inner body bleed hole, in accordance with an embodiment.

FIG. 4B is a graph 420 illustrating a force-displacement curve in both rebound and compression for the shuttle valve shock assembly 100 with the inclusion of an inner body bleed hole 555 and where the main piston 217 does not pass the refill hole(s) 540, in accordance with an embodiment.

Figure 4D:
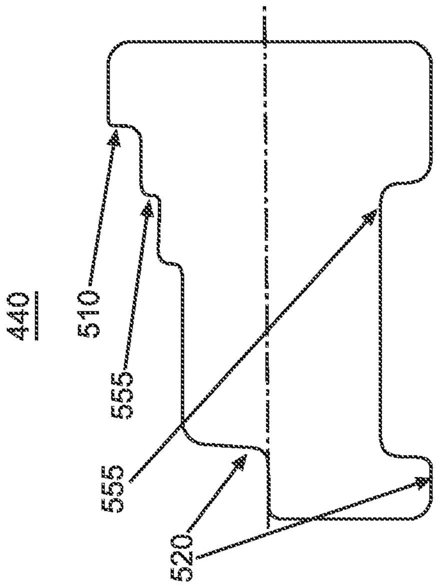
FIG. 4D is a graph illustrating a force-displacement curve in both rebound and compression for the shuttle valve shock assembly with the inclusion of an inner body bleed hole and a bearing bypass, in accordance with an embodiment.
Figure 4C:
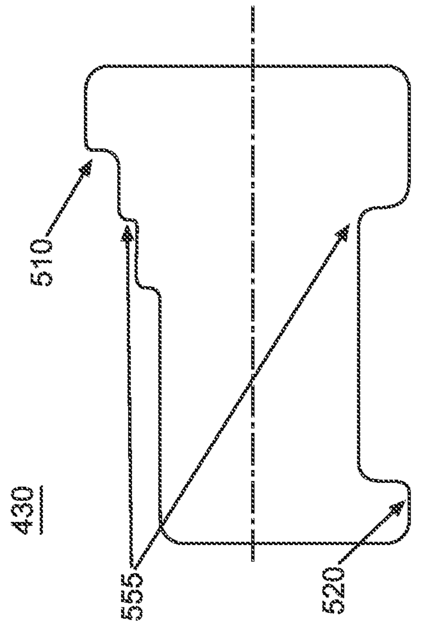
FIG. 4C is a graph illustrating a force-displacement curve in both rebound and compression for the shuttle valve shock assembly with the inclusion of an inner body bleed hole and a hydraulic top out, in accordance with an embodiment.

FIG. 4C is a graph 430 illustrating a force-displacement curve in both rebound and compression for the shuttle valve shock assembly 100 with the inclusion of an inner body bleed hole 555 and a hydraulic top out 520 and where the main piston 217 does not pass the refill hole(s) 540, in accordance with an embodiment.

FIG. 4D is a graph 440 illustrating a force-displacement curve in both rebound and compression for the shuttle valve shock assembly 100 with the inclusion of an inner body bleed hole 555 where the main piston 217 does pass the refill hole(s) 540, and a bearing bypass 520 is utilized in accordance with an embodiment.

As shown in graph 440, the bearing bypass configuration eliminates the "convention bypass configuration" compression nose while still allowing for a rebound top out (rebound catch). Moreover, the bypass assembly increase higher rebound characteristics at the end of stroke. Thus, the addition of the bearing bypass, movement of refill hole(s) 540, and overall modifications that are indicative of the novel structure of the bypass shuttle valve shock assembly 100 softens the compression nose at both ends of the stroke (e.g., bottom out and top out).

In one embodiment, the ride zone 593 is indicated by the range bracket. However, it should be appreciated that ride zones may be larger or smaller depending upon shock assembly type, terrain, vehicle type, vehicle use, factory settings, post-factory tuning (e.g., mechanic, do-it-yourself (DIY) owner, or the like).

Thus, the shuttle valve shock assembly 100 is able to be softer in the ride zone, since the main piston 217 can be bypassed via the bypass pathways while it is in the ride zone 593. Once the piston moves past the ride zone 593 and into the end zone (e.g., top out zone 591 or bottom out zone 598), there are no longer any bypass ports and as such, all of the fluid will have to move through the main piston 217. As such, the main piston 217 can be firm enough for the end zone operation, while, being less firm in the ride zone 593.

In so doing, the shuttle valve shock assembly 100 is able to have a lower damping force in a bigger ride zone as there is no longer a requirement for a base valve (which takes up real estate within the main chamber). In addition, there is no need for any pump around shock components as all the fluid that does not use the bypass will flow through the main piston 217.

Moreover, the shuttle valve shock assembly 100 does not require any raising of the reservoir pressure (and in fact allows the lowering of the reservoir pressure). By reducing the reservoir pressure force, the rod reaction force is also reduced. E.g., the base force required to start compressing the shuttle valve shock assembly 100. By lowering the rod reaction force, the ride quality is improved.

In addition, the reduction of required reservoir pressure will allow for lighter shock assemblies as they will not be required to maintain/contain a higher reservoir pressure.

Figure 5:
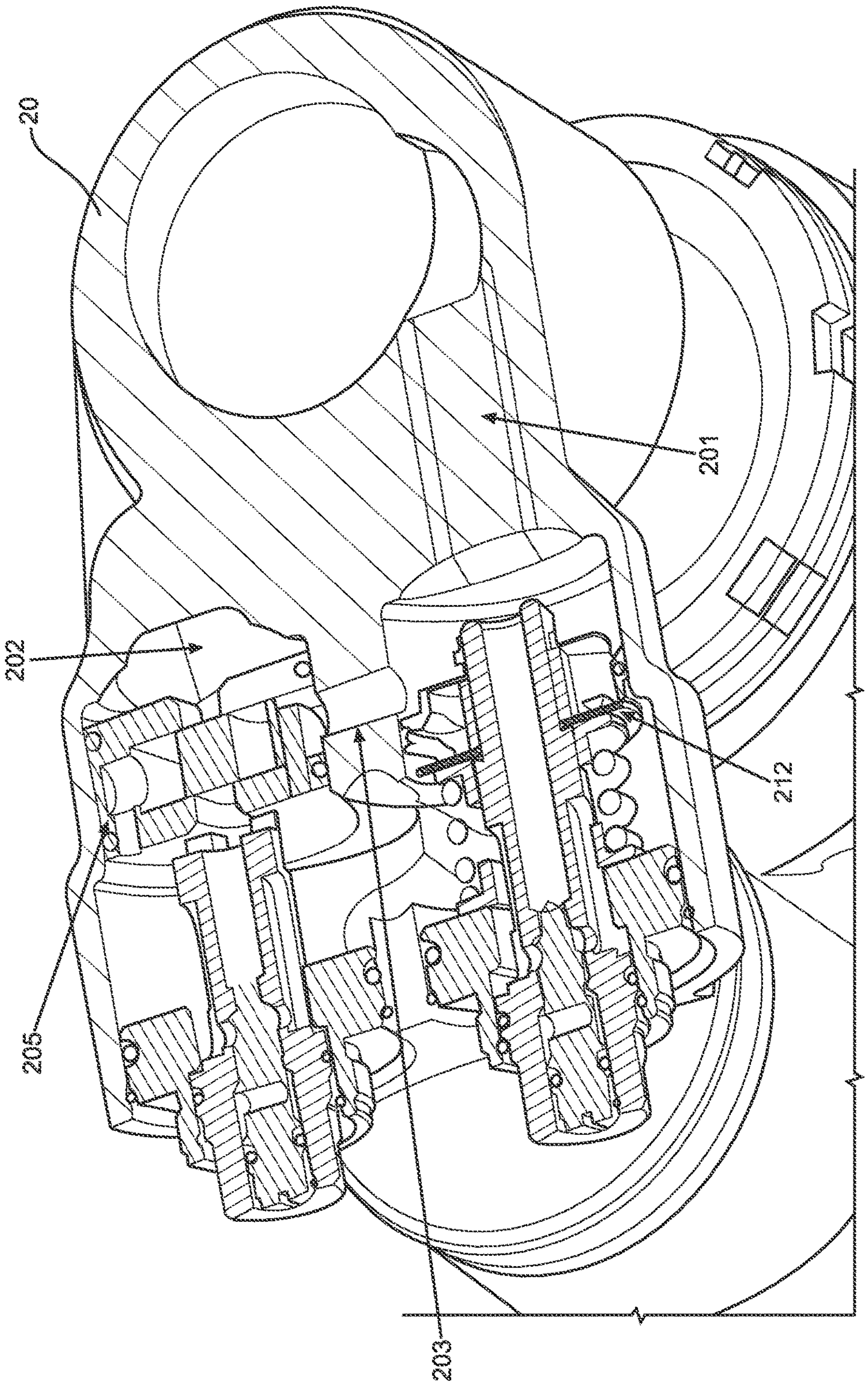
FIG. 5 is a perspective section view of the body cap valving of the shuttle valve shock assembly, in accordance with an embodiment.

Referring now to FIG. 5, a perspective section view of the body cap valving of the shuttle valve shock assembly 100 is shown in accordance with an embodiment. In one embodiment, body cap 20 includes the shuttle valve 205, the compression pressure port 203, bypass flow path 202, main flow path 201 to the inner body and compression and shaft reflow, and the check valve 212 (which in one embodiment is a check shim).

In one embodiment, the k value of the spring 214 is dependent upon the shaft 11 diameter. As such, the shaft diameter is balanced to ensure that the shaft displacement is large enough, quickly enough, to overcome the k value of the spring 214 and open the shuttle valve 205.

Figure 6A:
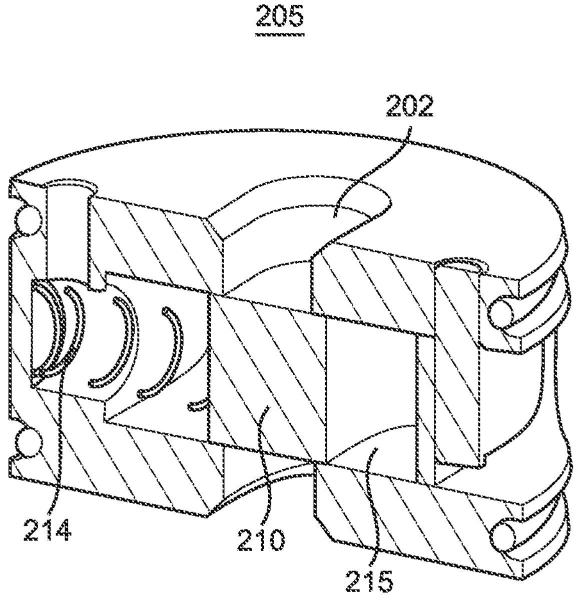
FIG. 6A is a side section view of the shuttle valve of the shuttle valve shock assembly, in accordance with an embodiment.

With reference now to FIG. 6A, a side section view of the shuttle valve 205 of the shuttle valve shock assembly 100 is shown in accordance with an embodiment. In one embodiment, the body 612 of the shuttle valve 205 is round. Shuttle valve 205 includes shuttle 210 with flow path 2 15, and spring 214.

Figure 6B:
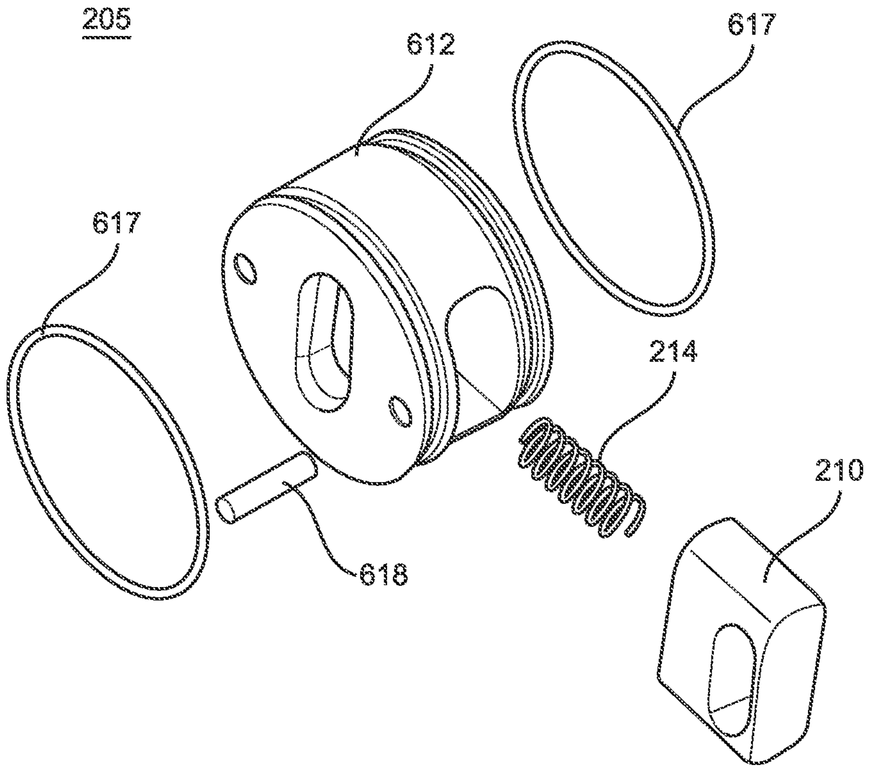
FIG. 6B is an exploded view of the shuttle valve of the shuttle valve shock assembly, in accordance with an embodiment.

Referring now to FIG. 6B, an exploded view of the shuttle valve 205 of the shuttle valve shock assembly 100 is shown in accordance with an embodiment. In one embodiment, the body 612 of the shuttle valve 205 is round. Shuttle valve 205 includes shuttle 210 with flow path 2 15, and spring 214. Shuttle valve 205 also includes two O-rings 617 to form the fluid seal and a stop pin 618.

In one embodiment, to reduce any noise that occurs when the shuttle valve 205 opens or closes, the stop pin 618 is covered with a sleeve, coating, or the like to reduce any contact noise between the stop pin 618 and the shuttle 210.

Figure 7A:
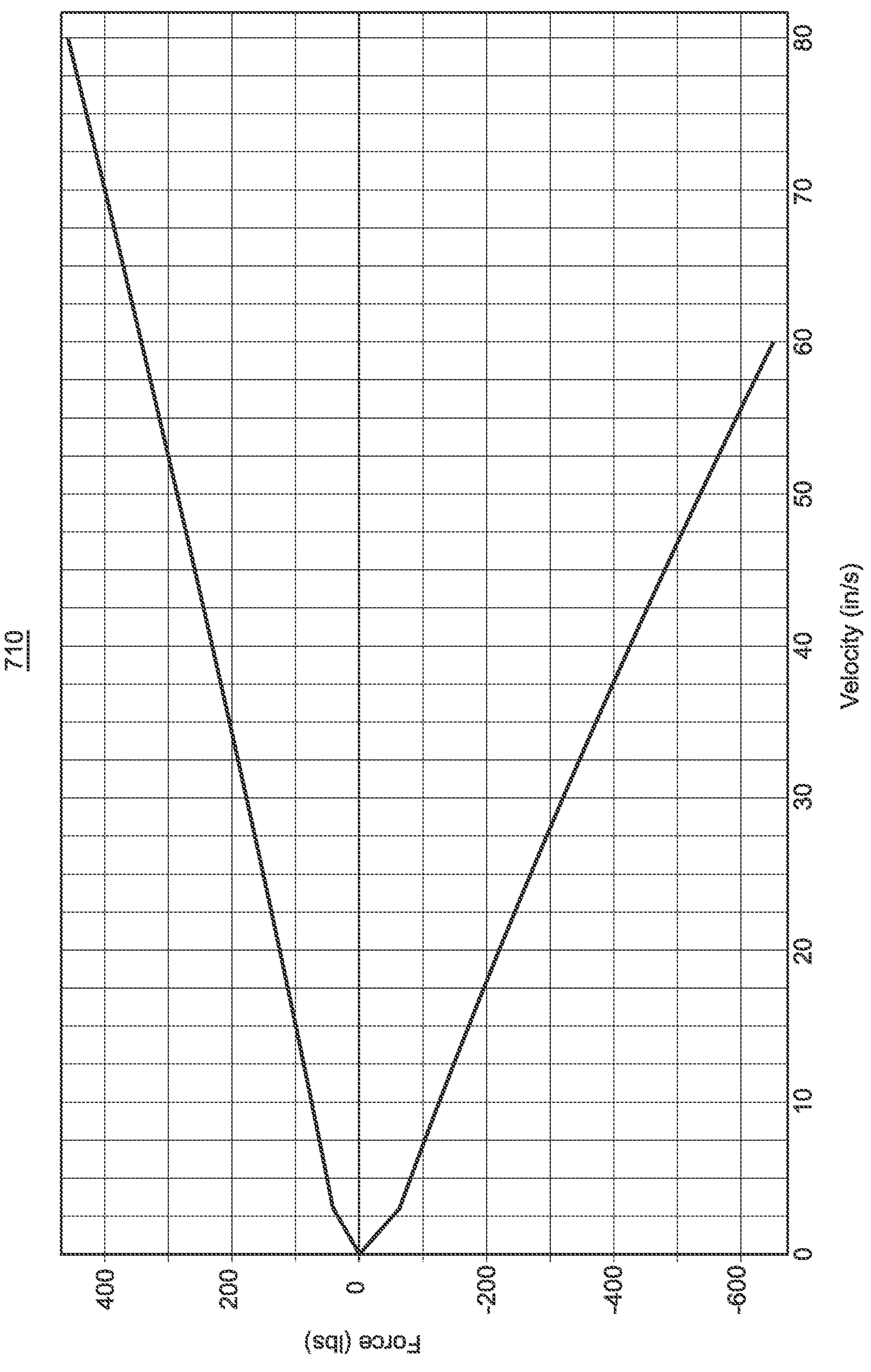
FIG. 7A is a graph of force vs. velocity of both rebound and compression, in accordance with an embodiment.
Figure 7B:
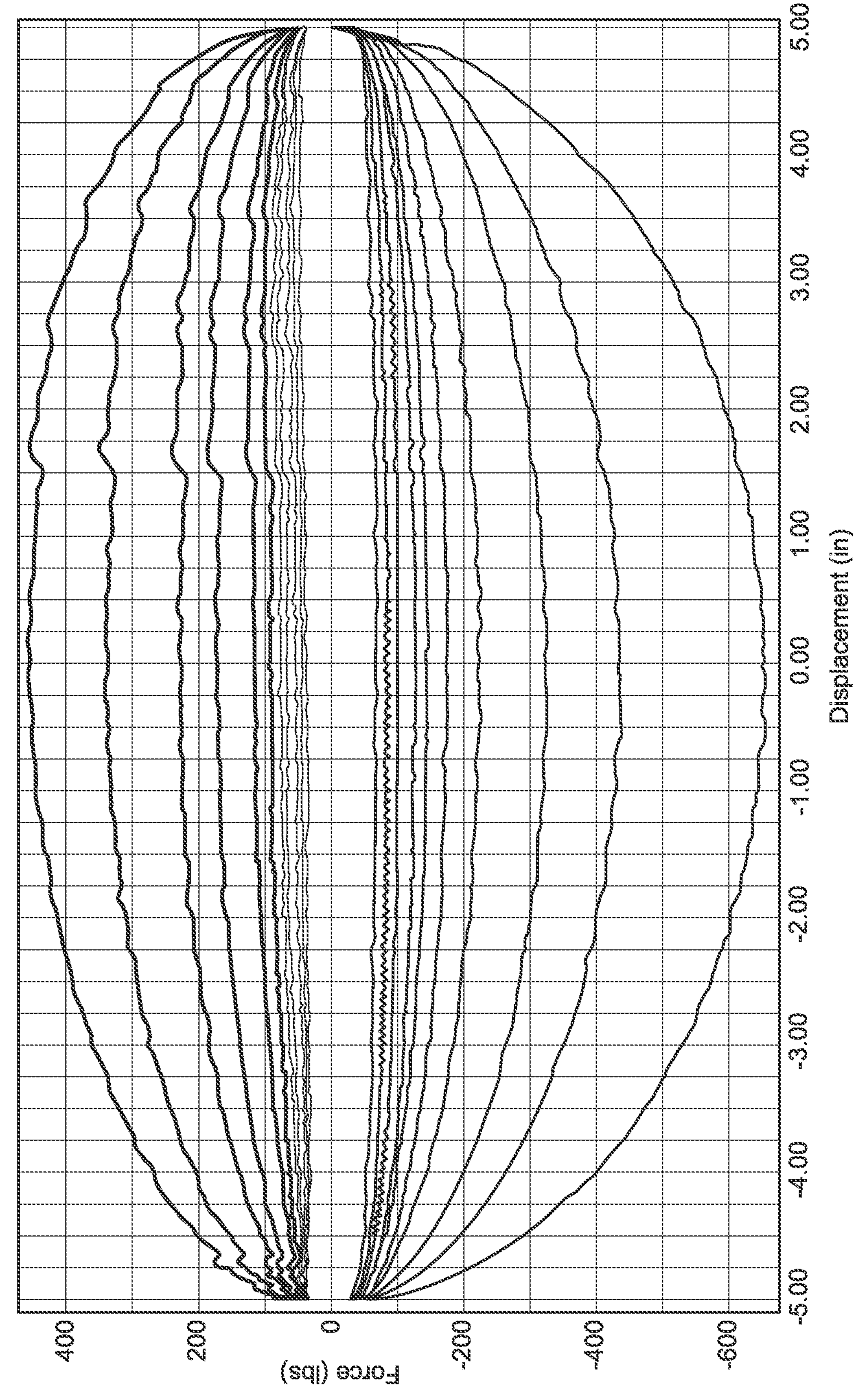
FIG. 7B is a dyno curve graph of force vs. displacement of both rebound and compression, in accordance with an embodiment.

With reference now to FIG. 7A, a graph 710 of force vs. velocity of both rebound and compression is shown in accordance with an embodiment. In FIG. 7B, a dyno curve graph 720 of force vs. displacement of both rebound and compression is shown in accordance with an embodiment. In the dyno curve, the shuttle valve shock assembly 100 ran to 80 in/s, sine wave, with 50 psi nitrogen pressure.

Figure 8A:
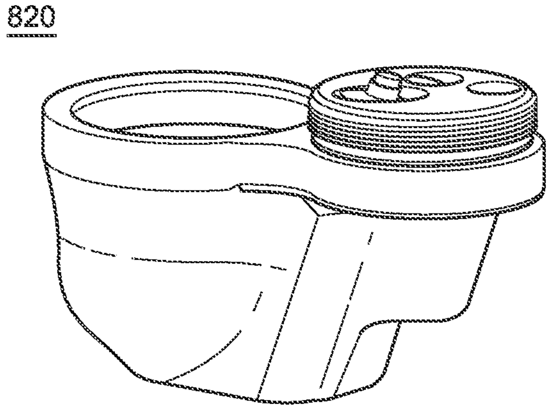
FIG. 8A is a perspective view of a piggyback body cap of a shuttle valve shock assembly, in accordance with an embodiment.
Figure 8B:
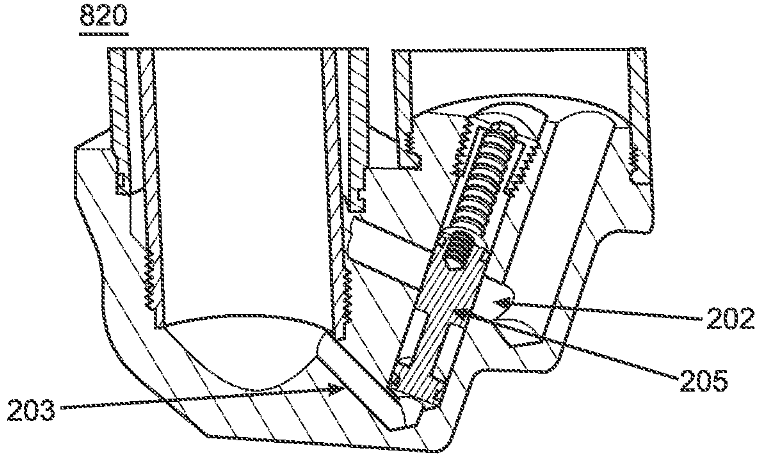
FIG. 8B is a side section view of the piggyback body cap of a shuttle valve shock assembly, in accordance with an embodiment.
Figure 8C:
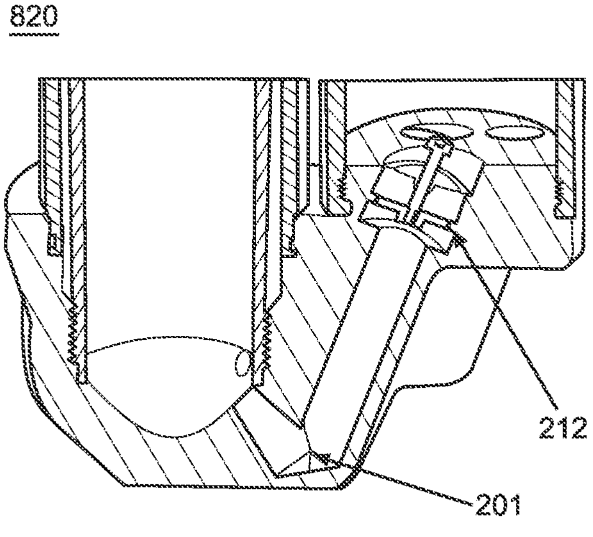
FIG. 8C is a side section view of the piggyback body cap of a shuttle valve shock assembly, in accordance with an embodiment.

With reference now to FIG. 8A, a perspective view of a piggyback body cap 820 of a shuttle valve shock assembly 100 is shown in accordance with an embodiment. FIG. 8B is a side section view of the piggyback body cap 820 of a shuttle valve shock assembly 100 shown in accordance with an embodiment with compression pressure port 203, shuttle valve 205, and shaft displacement/rebound port flow path 202. FIG. 8C is a side section view of the piggyback body cap 820 of a shuttle valve shock assembly 100 shown in accordance with an embodiment with shaft reflow/compression port flow path 201 and compression check valve 212.

In general, the integrated piggyback body cap 820 provides a readily upgradable capability to a legacy shock assembly.

In one embodiment, a significant adjustment (or tune) can be made to the shuttle valve shock assembly 100 characteristics by adjusting the reservoir 25 gas force pressure. For example, since the back side (or rebound side) of the piston 217 is always open to the reservoir pressure, the rebound damping force is inversely effected by changing the reservoir pressure. Specifically, as the reservoir pressure is increased, the rebound side damping force is decreased. For example, if the reservoir pressure is changed from 50 psi to 100 psi, 200 psi, etc., the rebound damping force is inversely effected. Thus, the shuttle valve shock assembly 100 can be tuned in the field by adjusting the reservoir pressure such as via Shrader valve 287 of FIG. 2B.

Thus, embodiments disclosed herein are able to avoid pressure differentials that can lead to cavitation inducing events during both compression and rebound (at high shaft speed and/or low shaft speed). Moreover, since there is no pressure differential during either rebound or compression, the gas pressure of the IFP can be maintained at a pressure that is less than, half of, a quarter of or a fraction of the pressures required when there are pressure differentials. As such, the shuttle valve architecture further provides the non-cavitation performance without having to lose the broad range of tunability (including, but not limited to, unnecessary stiffness and/or the softest damping characteristics) of the shock assembly.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A shock assembly comprising:

a main chamber;

a piston rod having a first end and a second end;

a piston coupled to said first end of said piston rod, said piston separating said main chamber into two portions, said first end of said piston rod not connected to a feature external to said main chamber, said second end of said piston rod configured to be coupled to said feature external to said main chamber;

a reservoir fluidically coupled with said main chamber; and a valve configured to control flow of fluid between said main chamber and said reservoir along a flow path, said valve configured to:

restrict said flow of said fluid between said main chamber and said reservoir, along said flow path, during a rebound stroke of said shock assembly; and allow flow of said fluid between said main chamber and said reservoir, along said flow path, during a compression stroke of said shock assembly, wherein said flow path is common to said flow of said fluid between said main chamber and said reservoir during both said compression stroke and said rebound stroke, wherein said reservoir is a remote reservoir and said remote reservoir comprises:

a fluid portion;

a gas portion; and a floating piston, said floating piston movably separating said fluid portion and said gas portion.

2. The shock assembly of claim 1 further comprising:

a second flow path fluidically coupling said main chamber and said reservoir, said second flow path enabling said flow of said fluid between said main chamber and said reservoir during said rebound stroke.

3. The shock assembly of claim 2, wherein said valve has an open position and a closed position, said valve moved to said open position by compression pressure generated by a check valve in said second flow path during said compression stroke of said shock assembly.

4. The shock assembly of claim 1 further comprising:

a port extending through said piston, said port configured to control flow of said fluid from a first side of said piston to a second side of said piston.

5. The shock assembly of claim 4 further comprising:

a bypass fluidically coupled with said main chamber and said reservoir, said bypass enabling said fluid to flow from said first side of said piston to said reservoir without requiring said fluid to pass through said port extending through said piston.

6. The shock assembly of claim 4 further comprising:

a bypass fluidically coupled with said main chamber, said bypass enabling said fluid to flow from said first side of said piston to said second side of said piston without requiring said fluid to pass through said port extending through said piston.

7. A damper comprising:

a main chamber;

a piston rod having a first end and a second end;

a piston disposed within said main chamber, said piston coupled to said first end of said piston rod, said piston separating said main chamber into two portions, said first end of said piston rod not connected to a feature external to said main chamber, said second end of said piston rod configured to be coupled to said feature external to said main chamber;

a reservoir fluidically coupled with said main chamber; and a valve configured to control flow of fluid between said main chamber and said reservoir along a flow path, said valve configured to:

restrict said flow of said fluid between said main chamber and said reservoir, along said flow path, during a rebound stroke of said damper; and allow flow of said fluid between said main chamber and said reservoir, along said flow path, during a compression stroke of said damper, wherein said flow path is common to said flow of said fluid between said main chamber and said reservoir during both said compression stroke and said rebound stroke, wherein said reservoir is a remote reservoir and said remote reservoir comprises:

a fluid portion;

a gas portion; and a floating piston, said floating piston movably separating said fluid portion and said gas portion.

8. The damper of claim 7 further comprising:

a second flow path fluidically coupling said main chamber and said reservoir, said second flow path enabling said flow of said fluid between said main chamber and said reservoir during said rebound stroke.

9. The damper of claim 8, wherein said valve has an open position and a closed position, said valve moved to said open position by compression pressure generated by a check valve in said second flow path during said compression stroke of said damper.

10. The damper of claim 7 further comprising:

a port extending through said piston, said port configured to control flow of said fluid from a first side of said piston to a second side of said piston.

11. The damper of claim 10 further comprising:

a bypass fluidically coupled with said main chamber and said reservoir, said bypass enabling said fluid to flow from said first side of said piston to said reservoir without requiring said fluid to pass through said port extending through said piston.

12. The damper of claim 10 further comprising:

a bypass fluidically coupled with said main chamber, said bypass enabling said fluid to flow from said first side of said piston to said second side of said piston without requiring said fluid to pass through said port extending through said piston.

13. A shock absorber comprising:

a main damper chamber;

a piston rod having a first end and a second end;

a damper piston disposed within said main damper chamber, said damper piston having a first side and a second side, said damper piston coupled to said first end of said piston rod, said damper piston separating said main chamber into two portions, said first end of said piston rod not connected to a feature external to said main chamber, said second end of said piston rod configured to be coupled to said feature external to said main chamber;

a port extending through said damper piston, said port configured to control flow of damping fluid from said first side of said damper piston to said second side of said damper piston;

a reservoir fluidically coupled with said main damper chamber; and a valve configured to control flow of said damping fluid between said main damper chamber and said reservoir along a first flow path, said valve configured to restrict said flow of said damping fluid between said main damper chamber and said reservoir, along said first flow path, during a rebound stroke of said shock absorber, said valve configured to allow flow of said damping fluid between said main damper chamber and said reservoir, along said first flow path, during a compression stroke of said shock absorber, wherein said first flow path is common to said flow of said damping fluid between said main damper chamber and said reservoir during both said compression stroke and said rebound stroke, wherein said reservoir is a remote reservoir and said remote reservoir comprises:

a fluid portion;

a gas portion; and a floating piston, said floating piston movably separating said fluid portion and said gas portion.

14. The shock absorber of claim 13 further comprising:

a bypass fluidically coupled with said main damper chamber and said reservoir, said bypass enabling said damping fluid to flow between said first side of said damper piston to said reservoir without requiring said damping fluid to pass through said port extending through said damper piston.

15. The shock absorber of claim 13 further comprising:

a second flow path fluidically coupling said main damper chamber and said reservoir, said second flow path enabling said flow of said damping fluid between said main damper chamber and said reservoir during said rebound stroke.

16. The shock absorber of claim 15, wherein said valve has an open position and a closed position, said valve moved to said open position by compression pressure generated by a check valve in said second flow path during said compression stroke of said shock absorber.

* * * * *